US011896975B2

(12) United States Patent
Kreusch et al.

(10) Patent No.: US 11,896,975 B2
(45) Date of Patent: Feb. 13, 2024

(54) SYSTEM FOR IMPLEMENTING BIOLOGICAL OR CHEMICAL METHODS

(71) Applicant: SCIENOVA GMBH, Jena (DE)

(72) Inventors: Stefan Kreusch, Golmsdorf (DE); Thomas Richter, Jena (DE); Raffael Rubick, Jena (DE)

(73) Assignee: Scienova GmbH, Jena (DE)

( * ) Notice: Subject to any disclaimer, the term of this patent is extended or adjusted under 35 U.S.C. 154(b) by 35 days.

(21) Appl. No.: 16/965,442

(22) PCT Filed: Jan. 30, 2019

(86) PCT No.: PCT/EP2019/052274
§ 371 (c)(1),
(2) Date: Jul. 28, 2020

(87) PCT Pub. No.: WO2019/149765
PCT Pub. Date: Aug. 8, 2019

(65) Prior Publication Data

US 2021/0053055 A1 Feb. 25, 2021

(30) Foreign Application Priority Data

Feb. 2, 2018 (DE) ..................... 10 2018 102 383.9

(51) Int. Cl.
*B01L 3/00* (2006.01)

(52) U.S. Cl.
CPC ....... *B01L 3/50825* (2013.01); *B01L 3/50853* (2013.01); *B01L 2200/0689* (2013.01); (Continued)

(58) Field of Classification Search
CPC .. B01L 3/08; B01L 3/50825; B01L 2300/046; B01L 2300/0858;
(Continued)

(56) References Cited

U.S. PATENT DOCUMENTS 7,604,739 B2 10/2009 Huang
8,012,350 B1 9/2011 Alam
(Continued)

FOREIGN PATENT DOCUMENTS

DE 102014004851 A1 10/2015
DE 102015216241 A1 3/2017
(Continued)

*Primary Examiner* — Jill A Warden
*Assistant Examiner* — Dwayne K Handy
(74) *Attorney, Agent, or Firm* — Hudak, Shunk & Farine Co. LPA

(57) ABSTRACT

The invention having functional vertical disposable reaction systems having a vertically mounted semipermeable membrane for sample preparation, chemical reactions, dialysis, enzymatic/microbiological fermentation, multistage processes, in vitro protein biosynthesis on a laboratory scale, formed from a base body and an exchangeable lid having different functions. For exchange across the membrane, the system is placed vertically into an outer volume consisting of gas, liquid or solid constituents. The system consists of a dimensionally stable base body and a liquid-tight lid having a functional support going toward the base of the base body, the dimensionally stable base body forming at least one noncapillary reaction space as inner volume with at least one semipermeable membrane as lateral wall. The high flexibility in use results from the combination of variants of the base bodies with different lid variants for different areas of use. The base bodies having different membranes and volumes can be coupled with lids having different feeding openings, contacts, sensor supports, gas supply means, circulation means, etc. This yields, in the case of m different base bodies and n different lid variants, m×n combinations having different properties.

15 Claims, 16 Drawing Sheets

(52) U.S. Cl.
CPC ... *B01L 2300/023* (2013.01); *B01L 2300/048* (2013.01); *B01L 2300/0618* (2013.01); *B01L 2300/0663* (2013.01); *B01L 2300/0681* (2013.01); *B01L 2300/0858* (2013.01)

(58) Field of Classification Search
CPC ... B01L 2300/126; B05D 47/00; B05D 47/12; B05D 47/123; B05D 47/126; B05D 47/128; G01N 33/50; G01N 33/5304; B65D 47/00; B65D 47/12; B65D 47/123; B65D 47/126; B65D 47/128
See application file for complete search history.

(56) References Cited

U.S. PATENT DOCUMENTS

| | | | | |
|---|---|---|---|---|
| 8,034,242 | B2 | 10/2011 | Huang | |
| 11,422,121 | B2 * | 8/2022 | Pessi | G01N 33/15 |
| 2002/0055187 | A1 * | 5/2002 | Treptow | B01L 7/00 436/518 |
| 2004/0110273 | A1 | 6/2004 | Akers et al. | |
| 2004/0132091 | A1 * | 7/2004 | Ramsey | G01N 33/558 435/7.1 |
| 2006/0029517 | A1 * | 2/2006 | Hartselle | A61B 10/0096 422/400 |
| 2006/0102547 | A1 | 5/2006 | Huang | |
| 2010/0136596 | A1 | 6/2010 | Rhode et al. | |
| 2010/0264085 | A1 | 10/2010 | Huang | |
| 2019/0204286 | A1 * | 7/2019 | Pessi | G01N 1/36 |

FOREIGN PATENT DOCUMENTS

| | | | | |
|---|---|---|---|---|
| WO | 9806496 | A1 | 2/1998 | |
| WO | 0190731 | A2 | 11/2001 | |
| WO | 2005087353 | A1 | 9/2005 | |
| WO | WO-2018060547 | A1 * | 4/2018 | G01N 1/36 |

* cited by examiner

SYSTEM FOR IMPLEMENTING BIOLOGICAL OR CHEMICAL METHODS

FIELD OF THE INVENTION

The invention relates to a system for carrying out biological or chemical methods, to its use and to a biological or chemical method.

In the area of life-science research and development, of the synthesis of, for example, molecular complexes and nanoparticles, of in vitro protein biosynthesis, purification of macromolecules and of cell culture, there is a need for versatile functional reaction vessels. Here, dialyzers and membrane reactors are increasingly being used as disposable vessels, since they avoid contamination and the effort of cleaning. Frequently changing tasks and changing processes mean limited quantities of the reaction vessels in question. This low quantity also only supports manufacture of the components in relatively small quantities. This gives rise to a higher cost of manufacture per unit. This in turn is in conflict with the advantageous use of disposable vessels, since the price increases as a result of the cost of manufacture.

BACKGROUND OF THE INVENTION scienova GmbH already offers various dialyzers as inserts having laterally mounted semipermeable membranes for vertical insertion in customary deep-well microplates and centrifuge tubes (https://www.scienova.com/). They are distinguished by rapid dialysis of small volumes in dialysis capillaries. Sample addition and removal is done in the upper part of the dialyzers by means of customary liquid-handling technology. They have the disadvantage that, therein, mixing in the sample space by dispensing is hardly practicable. The sample volume is limited by the capillary geometry used for dialysis, since, if the volume is enlarged by enlargement of the capillary cross-section and the capillary length, sample removal will be made difficult by breakage of the liquid column and the penetration of air bubbles, especially sample removal. If the sample volume is to be distinctly increased despite the very limited space in the case of use in vessels according to the SBS standard for microplates, a new solution must be found.

This solution is described under US 2010/0136596 A1. The dialyzers described therein consist of a solid body having openings and channels for sample addition and removal. In the designs currently available, volumes of 10 to 1000 μl sample volume are possible (https://www.scienova.com/). An advantage is the possibility of parallel sample handling and of rapid dialysis due to the geometry with small diffusion distances. However, they have the disadvantage that they are each limited to their volume range and the fixed design of the upper regions for sample addition and removal. Furthermore, in the reaction space, they hardly offer the possibility for mounting sensors together with the associated supply of power and transmission of data.

Thermo Scientific (http://www.piercenet.com/product/rapid-equilibrium-dialysis-red) offers a device containing 48 individual inserts for vertical dialysis in microtiter plate format. The inserts consist of a plastics base body having a tube composed of a dialysis membrane forming the sample space. They are arranged in the grid of microplates. However, the inserts are, in terms of their geometry, matched with a specific outer plate for said inserts. This does not make it possible to use standard vessels such as deep-well plates. The effort in handling is relatively high, since said inserts are used individually and the specific outer plate must be dismantled and cleaned after use. Filling and emptying is carried out by pipette tips having to be guided as far as the base. Particularly in the case of manual operation, there is the risk here that the pipette tip can damage the semipermeable membrane. The large free opening increases the risk of contamination. This solution is described in U.S. Pat. No. 7,604,739 B2, U.S. Pat. No. 8,034,242 B2, US 2006/0102547 A1 and US 2010/0264085 A1. The devices described therein are, owing to their fixed geometry with the top opening and the limited sample volume of approx. 800 μl, not capable of handling relatively large sample volumes and of using sensor technology. This means that they are closely tied to their specific use for equilibrium dialysis in the volume range to 800 μl.

GENE BIO APPLIC LTD describes, in WO 2001/090731 A3, a tube having a vertically clamped piece of dialysis tubing and screw cap. It is used as a dialysis device for floating dialysis in different volumes. In the design as product by GENE BIO APPLIC LTD, a combination of tube with screw caps of differing dimension is used for volume displacement of the sample volume in the tube. It displaces the sample from the base of the tube, and so the membrane is, in the case of smaller sample volumes, in communication with the sample volume on a larger surface area. It is thus possible to enlarge the active surface area of the membrane for different sample volumes. Otherwise, the screw cap serves solely for the secure closure of the tube and does not have any openings. This means that it is not possible to achieve mixing, supply of gas and sample input/removal. The use of sensors in the sample space is, too, neither intended nor possible.

SUMMARY OF THE INVENTION

It is an object of the invention to develop a versatile type of reaction vessels provided with semipermeable membranes. Here, the cost of manufacture is to be kept low for a large number of variably usable reaction vessels such that the realization of disposable reaction vessels is possible. Disposable vessels have the advantage that complicated cleaning and sterilization processes can be omitted. The vessels are to be matchable with existing liquid-handling technology, to allow simple sample removal and addition, and to allow mixing and supply of gas and also the use of online measurements by the use of sensors in the reaction space together with the associated supply of power, storage of data and transmission of data.

This is achieved by the combination of base bodies having semipermeable membranes with matchable lids which can comprise different functional supports having functional features, as described in the invention. The system according to the invention can comprise a multiplicity of (m) different lids and/or (n) different base bodies in order to open up an even larger multiplicity of possible uses with disposable vessels. The lids can especially differ with respect to their functional features, it also being possible for a lid to comprise multiple identical or different functional features. Particularly preferably, lids in the system according to the invention can comprise complementary functional features, such as, for example, functional features intervening in the method and functional features capturing method data. Base bodies can especially differ with respect to their size and outer shape in order to be able to be matched to different outer volumes.

The object is achieved by a system for carrying out biological or chemical methods, comprising at least one base body and at least one separately provided lid which is matched with the base body such that lid and base body can form a firm connection with one another, wherein the base body comprises at least one structural element and at least one membrane and the membrane at least sectionally borders an inner volume of the base body as a lateral wall running substantially in parallel to the longitudinal axis of the base body, wherein the lid comprises at least one functional support which is, at its proximal end, connected to a sealing section of the lid and comprises, in the region of its distal end, one or more functional features, wherein the inner volume has a proximal section which is, upon connection of lid and base body, arranged in the proximity of the sealing section and a distal section which has, upon connection of lid and base body, a distance from the sealing section that is at least 90% of the maximal distance from the sealing section within the inner volume, wherein the distal end of the functional support is, upon connection of lid and base body, arranged in the distal section, wherein the functional features are suitable for capturing, changing and/or influencing states of biological or chemical methods.

A "firm" connection is understood to mean a connection which does not inadvertently disengage. Preferred connections are form-fitting connections such as, for example, snap-into-place or click-into-place connections or interlocks. The firm connection can be realized such that it cannot be disengaged without destruction of the lid and/or the base body. In one embodiment, the firm connection is realized via a combination of a penetrating connecting element, especially at the lid, with a receiving connecting element, especially at the base body.

The lid is especially matched with respect to its outer shape with the base body such that the functional support of the lid can be introduced into the inner volume of the base body. After complete insertion, the distal end of the functional support is situated in the distal section of the inner volume and a lid and base body form the firm connection especially by snapping of the respective connecting elements into place.

In one embodiment, the base body has an opening of the inner volume that is, upon connection of the base body to the lid, closed by the sealing section thereof. Here, what is in accordance with the invention is especially a liquid-tight and/or gas-tight connection, and what is possible as a result is, for example, specific supply of gas to the inner volume and/or control of the pressure or the reaction atmosphere. Preferably, the connection of lid and base body achieves a closure by means of a lip seal or an elastic seal. The closure can also be achieved via a seal due to adhesive bonding, welding, fitting of the parts (e.g., conical surfaces), or potting of the gaps.

The base body comprises structural elements and at least one membrane. In one embodiment, structural elements and membrane form the base body. The inner volume is at least sectionally bordered by the membrane, especially to a large extent. Preferably, the inner volume is bordered on at least 50%, at least 65% or at least 75% of its area by the membrane. This allows a maximally efficient material exchange with an outer volume. The structural elements serve to stretch the membrane, since said membrane itself is not sufficiently firm for forming the inner volume. Preferably, the inner volume falls in the distal section to a low point or a line, with the result that a liquid present in the inner volume or else solids can collect there. Thus, even small volumes can be easily treated, especially removed or supplied with gas from below, using the system.

The structural elements preferably essentially consist of injection-moldable plastic, such as, in particular, polystyrene, polycarbonate, polypropylene, polyethylene, polyoxymethylene, thermoplastic polyurethane or combinations thereof. This has the advantage that the base bodies can be produced via injection-molding, which is very economical. The same preferably also applies to the lid and its parts, especially sealing section and functional support.

The membrane forms at least part of the lateral wall of the inner volume. The orientation of the base body during use is preferably vertical, i.e., the longitudinal axis points downward, with the result that the lateral wall is vertical. This has the advantage that the membrane is not clogged with suspended solids or other particulate or cellular constituents.

The membrane is especially a semipermeable membrane which preferably consists of regenerated cellulose, mixed cellulose ester, polyethersulfone, polycarbonate, microcellulose, ceramic, silicone, plastics mixture or combinations thereof. The membrane can be attached on the surfaces intended therefor, especially to structural elements, by adhesive bonding, bonding, welding, clamping or overmolding of the plastic of the support on the membrane.

In one embodiment, the inner volume encompasses from 50 μl to 200 ml, especially from 1000 μl to 150 ml, from 3 ml to 100 ml, from 6 ml to 75 ml, from 10 ml to 50 ml or from 15 ml to 30 ml. Owing to the flexibility with respect to the functional features, it is also possible to use relatively large inner volumes. For instance, a functional feature can, for example, make it possible to stir or mix the inner volume. Owing to the arrangement of the functional features at the distal end of the inner volume, even small volumes are equally treatable without any problems.

According to the invention, the lid comprises at least one functional feature. According to the invention, a distinction is made between functional features which intervene in the method ("intervening functional features") and those which capture a property of the method ("capturing functional features"). The simplest intervening functional feature is an opening in the functional support, which can be tubular. This makes it possible to realize sampling from the inner volume, filling of the inner volume and/or supply of gas to the inner volume. In the case too of a dense arrangement of multiple systems or other confined conditions, it is possible to perform sample addition and withdrawal through the lid. Preferred intervening functional features are openings for filling and removal of material from the inner volume, or for supply of gas to the inner volume, and also stirrers for mixing of the inner volume.

The functional features present on the functional support according to the invention can be very different. A capturing functional feature preferred according to the invention is a sensor, especially a temperature sensor or a conductivity sensor or a combination thereof. Preferred capturing functional features encompass sensors for measurement of temperature, viscosity, conductivity, pH, glucose content, oxygen content, $CO_2$ content, ion concentration, especially by means of ion-selective sensors ($Ca^{2+}$, $K^+$, $Na^+$, $F^-$, $NH_4^+$), potentiometry and/or radioactivity.

In a preferred embodiment, a functional feature is a gas-supply opening, filling opening or removal opening, or a combination thereof. In a preferred embodiment, a functional support comprises both one or more capturing functional features and one or more intervening functional features. In one embodiment, a lid comprises multiple functional supports which can each comprise one or more functional features, especially different functional features.

In one embodiment, the lid comprises at least one positioning element for connection of the lid to further lids, to an outer vessel and/or to a float.

In particular embodiments, the lid can comprise contacting elements, especially for supply of power and/or transmission of data. This is particularly advantageous when using functional supports having capturing functional features such as sensors, since a wired transmission of the captured data is thus possible. In another embodiment, a wireless transmission of the captured data is realized. The functional support forms the connection between sealing section of the lid and the functional feature in the distal section of the inner volume. It can have a flat or a round cross-section and can especially be tubular.

What is also according to the invention is the use of a system according to the invention for carrying out biological or chemical methods, especially for carrying out sample preparation, chemical reactions, dialysis, enzymatic/microbiological fermentation, multistage processes, in vitro protein biosynthesis on a laboratory scale, multistep sample processing, sample transport, protein renaturation, sample storage, sample purification, sample concentration, sample dilution, fermentation with or without cells, in vitro protein biosynthesis, enzymatic or nonenzymatic multistage reactions, rebuffering, pH adjustment, sample dialysis, media change, cell culture, supply of gas to a sample, removal of gas from a sample and also combinations thereof.

The use encompasses especially the only singular use of the lid and/or base body in the context of a consumable/disposable article.

A method for carrying out biological or chemical methods using the system according to the invention is part of this invention, too. The method comprises the following steps:

- providing an outer volume,
- providing a base body,
- selecting a suitable lid with respect to the functional features thereof,
- connecting base body and lid,
- inserting base body with lid into the outer volume,
- carrying out a biological, physical and/or chemical reaction.

The outer volume can especially be formed by customary laboratory vessels, such as, in particular, beakers, troughs, photo trays, pails, bowls, basins and vessels in the basic format of SBS microplates, or vessels produced in a specifically matchable manner.

The performance of the reaction can especially be carried out under circulation of the sample and/or supply of gas to the sample, especially using air.

In preferred embodiments, the method further comprises the step

- disposing of the lid and/or the base body after use.

During the use of the system or the performance of the method, a selective material exchange takes place across the membrane. The material exchange is caused by osmotic pressure or concentration gradients and is especially not pressure-driven.

The system according to the invention especially comprises functional vertical disposable reaction vessels having a vertically mounted semipermeable membrane for sample preparation, chemical reactions, dialysis, enzymatic/microbiological fermentation, multistage processes, in vitro protein biosynthesis on a laboratory scale, formed from a base body and an exchangeable lid having different functions. For exchange across the membrane, the reaction vessel(s) is/are placed vertically into an outer volume consisting of gas, liquid or solids, such as nonwovens, granules or sponges, for selective take-up of substances across the membrane. The reaction vessel can consist of a dimensionally stable base body and a liquid-tight lid having a tube going toward the base of the base body, the dimensionally stable base body forming at least one noncapillary reaction space as inner volume with at least one semipermeable membrane as lateral wall.

The high flexibility in use of the system of this invention results from the combination of variants of the base bodies with different lid variants for different areas of use. The base bodies having different membranes and volumes can be coupled with lids having different feeding openings, contacts, sensor supports, gas supply means, circulation means, etc. This yields, in the case of m different base bodies and n different lid variants, m×n combinations having different properties.

DETAILED DESCRIPTION OF THE INVENTION

Figure 1A:
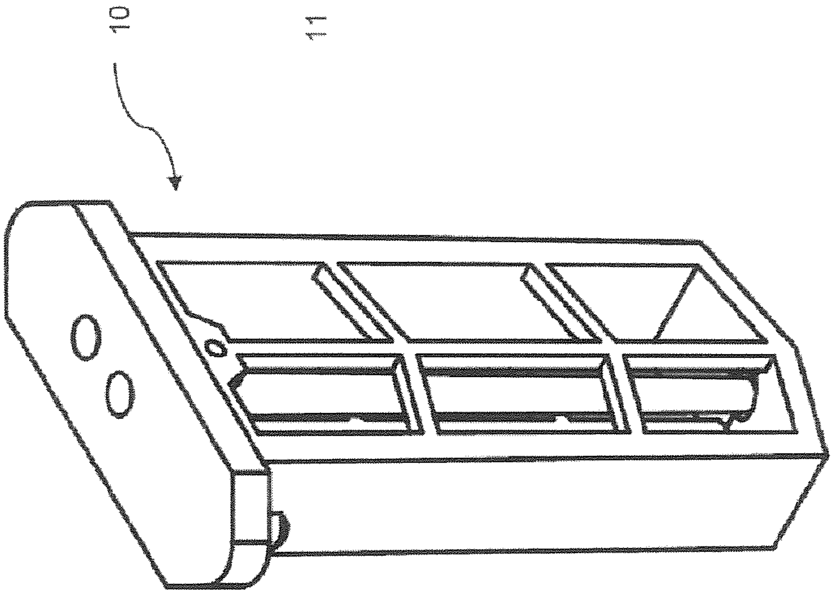
FIGS. 1A to 1C show the system (10) according to the invention and its essential parts, namely the base body (11) and the lid (12).
Figure 1B:
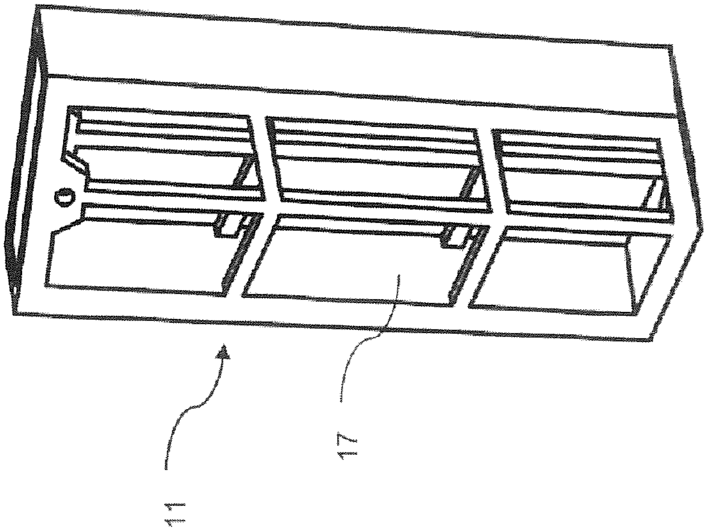
Figure 1C:
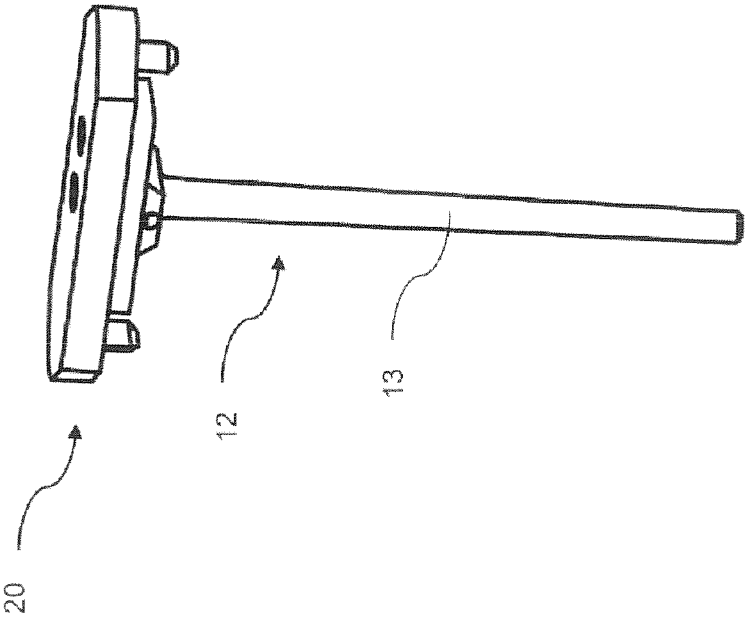

FIGS. 1A to 1C show the system (10) according to the invention and its essential parts, namely the base body (11)

and the lid (12). The lid consists of a sealing section (20) and a functional support (13). The base body (11) forms an inner volume (17).

Figure 2B:
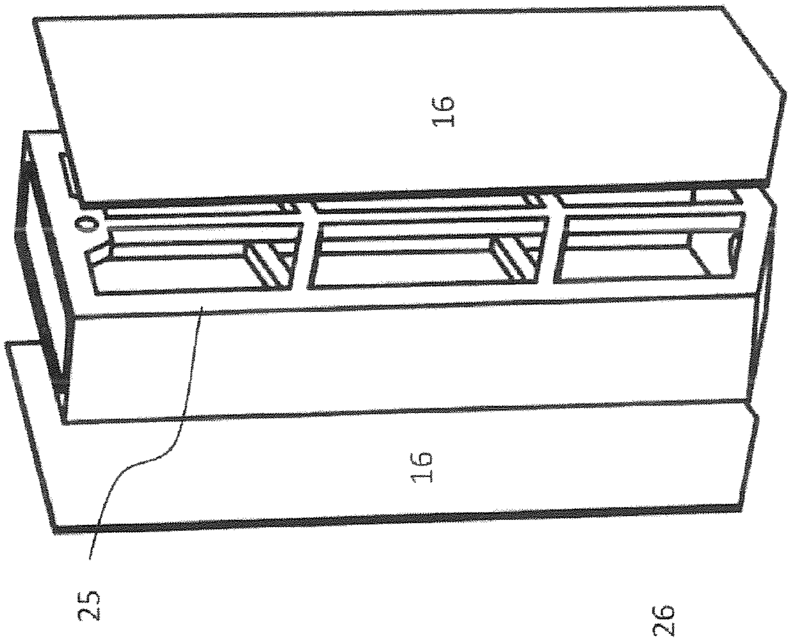
FIGS. 2A and 2B show a base body (11) comprising laterally downward leading crossbeams (21) as structural elements.
Figure 2A:
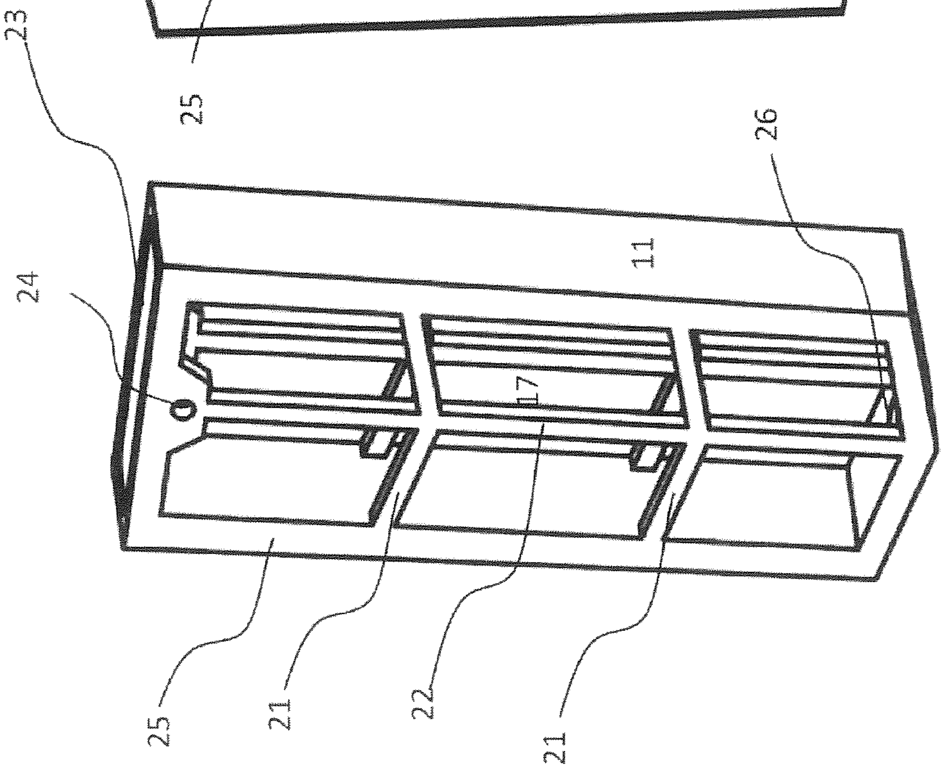

FIGS. 2A and 2B show a base body (11) comprising laterally downward leading crossbeams (21) as structural elements. In general, the structural elements preferably have a substantially uniform thickness of preferably 0.5 mm to 5 mm and thicknesses of 1 mm to 8 mm and preferably a center strut (22) of approximately identical thickness to the crossbeam (21). In the upper part, the base body (11) contains an opening (23) having smooth inner sides which form the countersurfaces in relation to sealing elements of the lid. Situated above the center strut (22) is a snap-in opening (24) which can be used as a countersupport of a snap-in attachment of the lid. The structural elements (21, 22, 25) of the base body (11) preferably, but not necessarily, substantially consist of injection-moldable plastic such as polystyrene, polycarbonate or polypropylene. The membrane is, as shown in FIG. 2B, attached in a flush manner on the lateral crossbeams (21), the center strut (22) and the lateral faces (25) by adhesive bonding or welding and also closes the snap-in opening (24). The inner space (17) is formed by the base body (11) and the membrane (16) preferably sitting thereon in a flush manner. The semipermeable membrane (16) ensures that the sample volume present in the inner volume (17) is in a state of material exchange with an outer volume. The lower part (26) of the base body is V-shaped here. The sample volume thus runs together in the middle of the base body and residual amounts collect in a central cavity in the distal section (26), into which the functional support of the lid (not shown) reaches. At this deepest point, the liquid (sample) which fills the inner volume (17) of the reaction vessel can thus be almost completely treated by a functional feature on the functional support or captured using sensors. The outer dimensions of the present base body (11) are sized such that the system can be inserted either at a right angle to the walls of the standard reaction vessel "hitplate 80" 80.0 ml deep-well microtiter plate or diagonally into the reaction space of same, with nubs on the lid being able to ensure holding of the position.

Figure 3B:
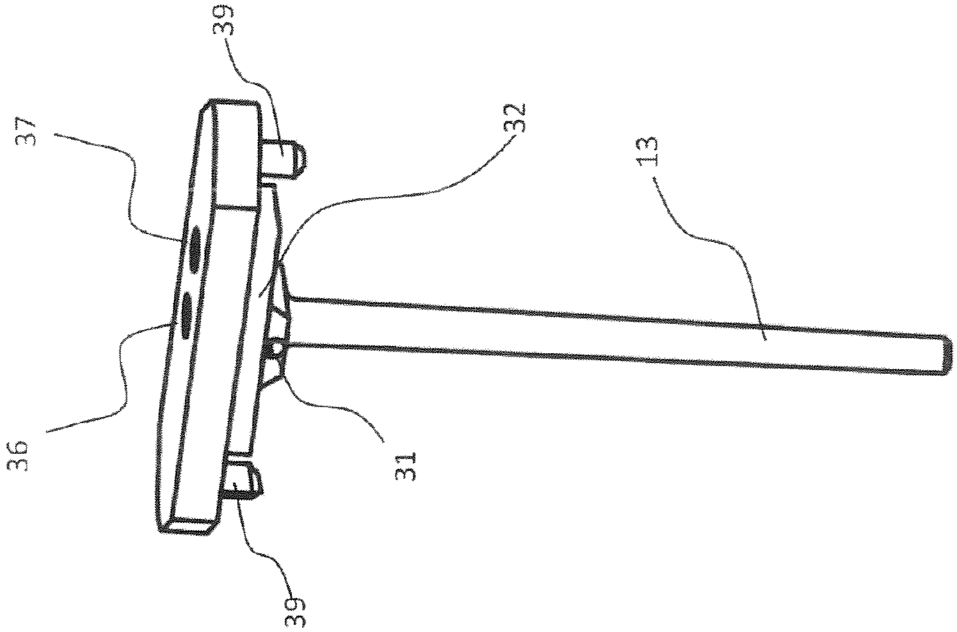
FIGS. 3A and 3B show a lid.
Figure 3A:
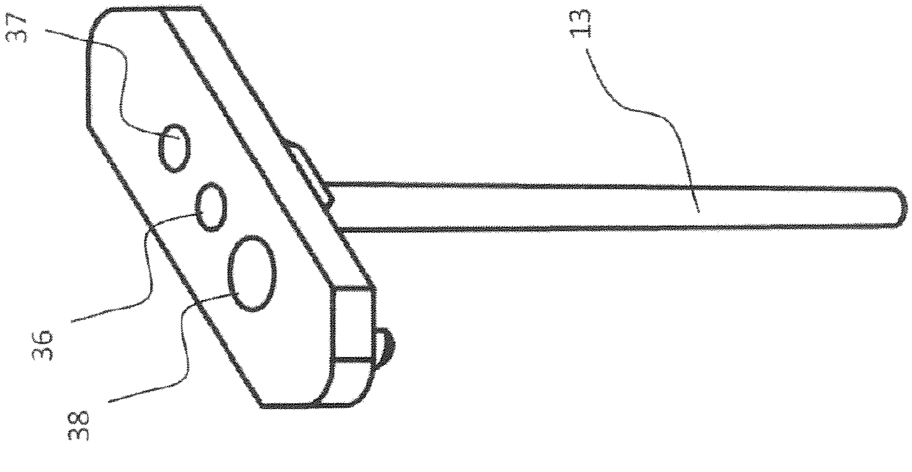

FIGS. 3A and 3B show a lid which, in the present embodiment, comprises an injection-molded part composed of polypropylene and two openings (36 and 37) which penetrate the upper part of the lid and are conical (LUER taper in accordance with DIN 13090). The fill-in opening (36) is connected to a functional support (13) in the form of a vertical tube and reaches into the distal section of the base body. The opening (37) penetrates the upper part of the lid and serves here for the venting of the inner volume upon filling of same through the opening (36) or optionally through further openings. The Luer taper allows the liquid-tight connection of injection syringes for filling and emptying of the inner volume, but is also suitable for the use of customary pipettes having exchangeable pipette tips, pipettes, serological pipettes, Pasteur pipettes and pipetting machines. It is also possible to fill and empty the inner volume using a suitable injection cannula through the opening (36) and the vertical tube (functional support, 13), any damage to the membrane being prevented by the guidance of the injection cannula in the functional support (13). A further opening (38) is realized with a larger diameter and provided with a NS7/16 taper in accordance with DIN 12242. It allows the filling and emptying of the inner volume and sampling by means of larger pipettes or fluid-handling systems having a suitable connector. When not in use, all openings can be closed by suitable plugs.

The face (32) bears sealing elements which, in the present form, have been realized as multiple sealing lips lying one after another. They are in contact with the inner faces of the opening (23, not shown) of the base body when lid and base body are pressed together, and prevent the escape of liquid. A protrusion (31) irreversibly clicks into place into the opening (24, not shown) of the base body when lid and base body are pressed together and prevents disengagement of lid and base body by mechanical forces. The holding means (39), in the form of nubs here, likewise serve for the connection of lid and base body.

Figure 4C:
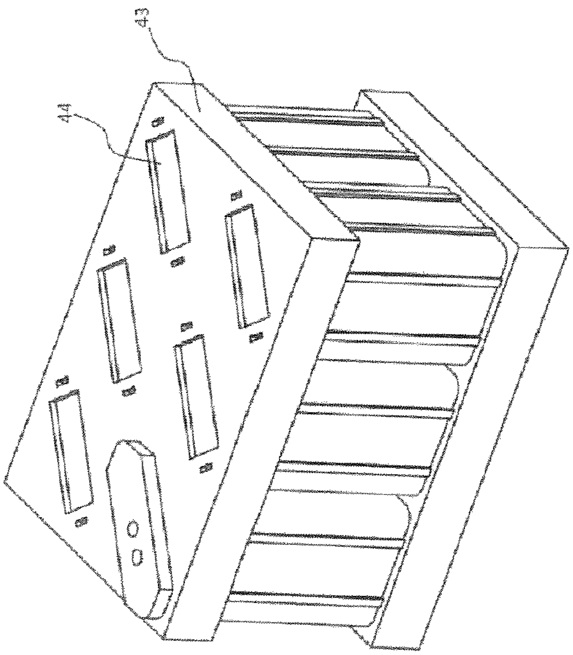
FIGS. 4A to 4C show examples of the volume (47) outside the base body (outer volume), with which the solution present in the inner volume is in contact through the semipermeable membrane.
Figure 4B:
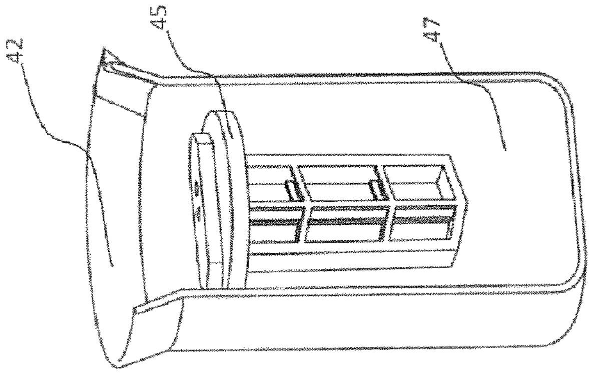
Figure 4A:
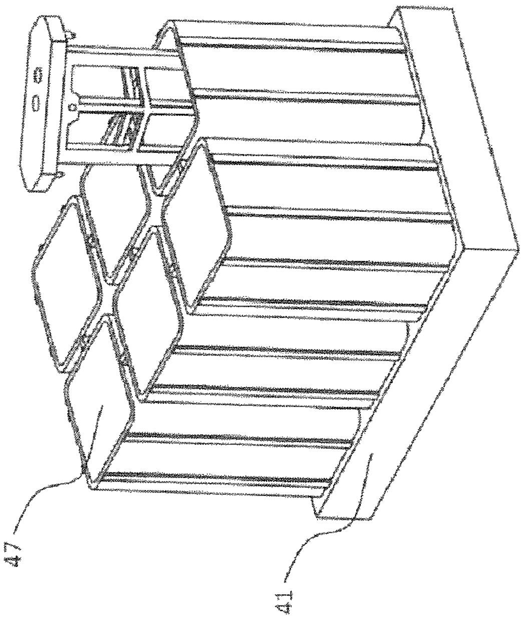

FIGS. 4A to 4C show examples of the volume (47) outside the base body (outer volume), with which the solution present in the inner volume is in contact through the semipermeable membrane. The outer volume can likewise consist of a customary laboratory vessel (beaker, trough, pail) (42), it being possible for the reaction vessel to be held at the liquid surface by a floating body (45) made from a specifically light, inert material, for example foamed plastic. The membrane preferably consists of regenerated cellulose, but can also consist of the materials stated in the above description, individually or in combination.

Figure 5:
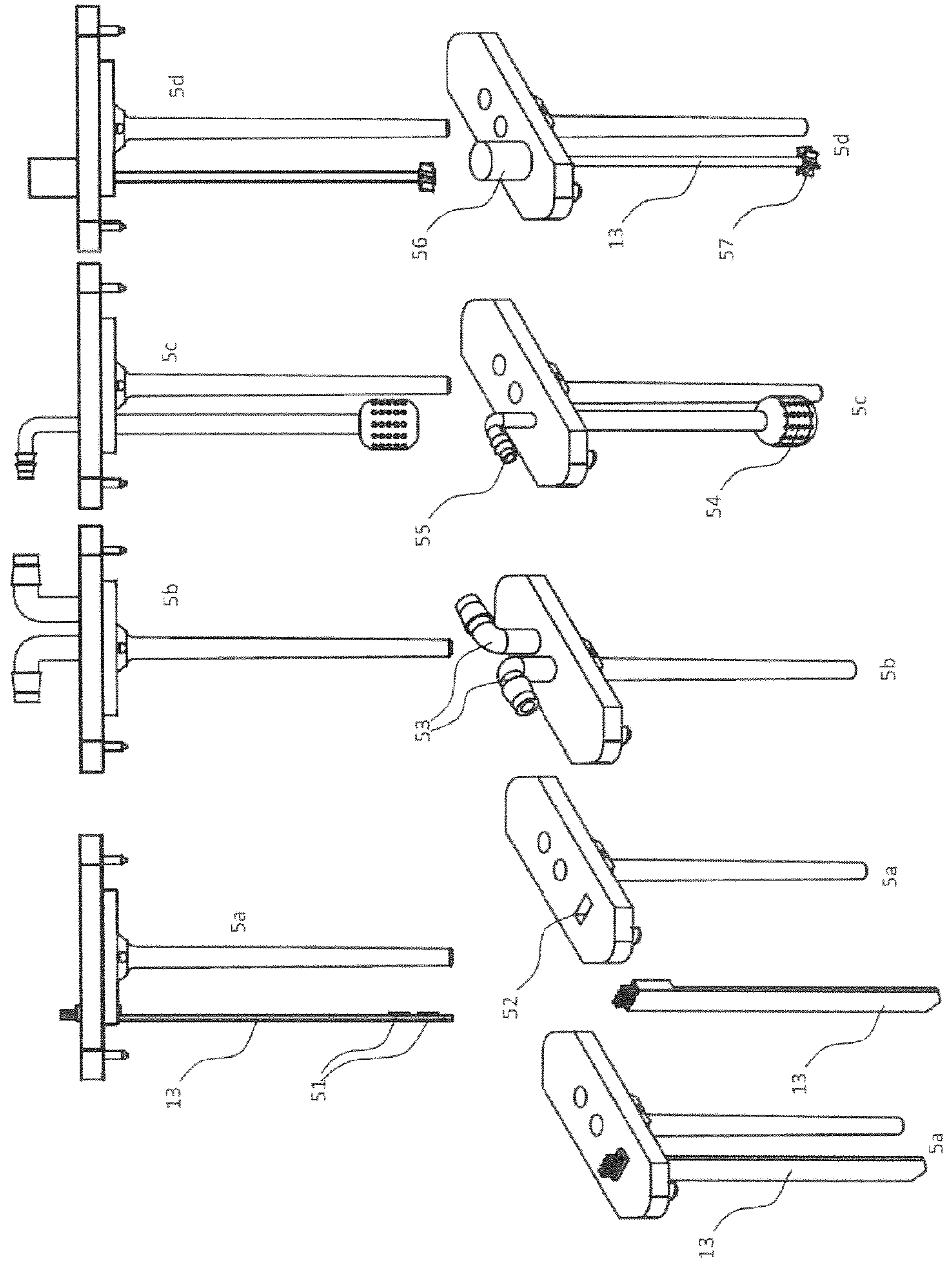
FIG. 5 shows exemplary lid variants 5*a* to 5*d*.

FIG. 5 shows exemplary lid variants 5*a* to 5*d*. The lid according to variant 5*a* contains electronic components (51) as functional features which are arranged on a functional support (13). The support is tightly inserted into a corresponding recess of the lid (52). The support (13) can, however, also be an integral component of the lid, for example overmolded.

The lid according to variant 5*b* contains, in the functional openings of the lid, angular pieces (53) having tubing connectors which, for example, can be purchased from companies known for medical-technology fluid systems (fluid management components). Said angular pieces (53) are inserted into the functional openings of the lid by means of a LUER taper in a mechanically fixed, liquid-tight and gas-tight, but reversibly removable, manner. They allow the connection of the system to external systems or the circulation of the liquid volume present in the inner volume by means of a pump and/or the supply of gas especially for mixing and gas enrichment or depletion of the sample solution by a pump or gas supply line with elevated pressure.

The lid according to variant 5*c* contains an air outlet (54), through which gases can be conducted through the liquid present in the inner volume by means of a connecting piece (55). The gas is distributed into fine bubbles through fine openings, holes or slits in the air outlet (54). Alternatively, the air outlet can also consist of porous materials. The introduced gas flows through a functional opening into the atmosphere. Alternatively, a connecting piece (e.g., such as 53) can be inserted into the functional opening and the gas can be circulated, for example for the purpose of mixing the liquid volume.

The lid according to variant 5*d* contains a stirring device consisting of a miniature electric motor (56), a further functional support (13) in the form of a stirrer shaft and a functional feature in the form of a propeller stirrer (57). Said device serves for the continuous and/or periodic mixing of the liquid present inner volume.

Figure 6B:
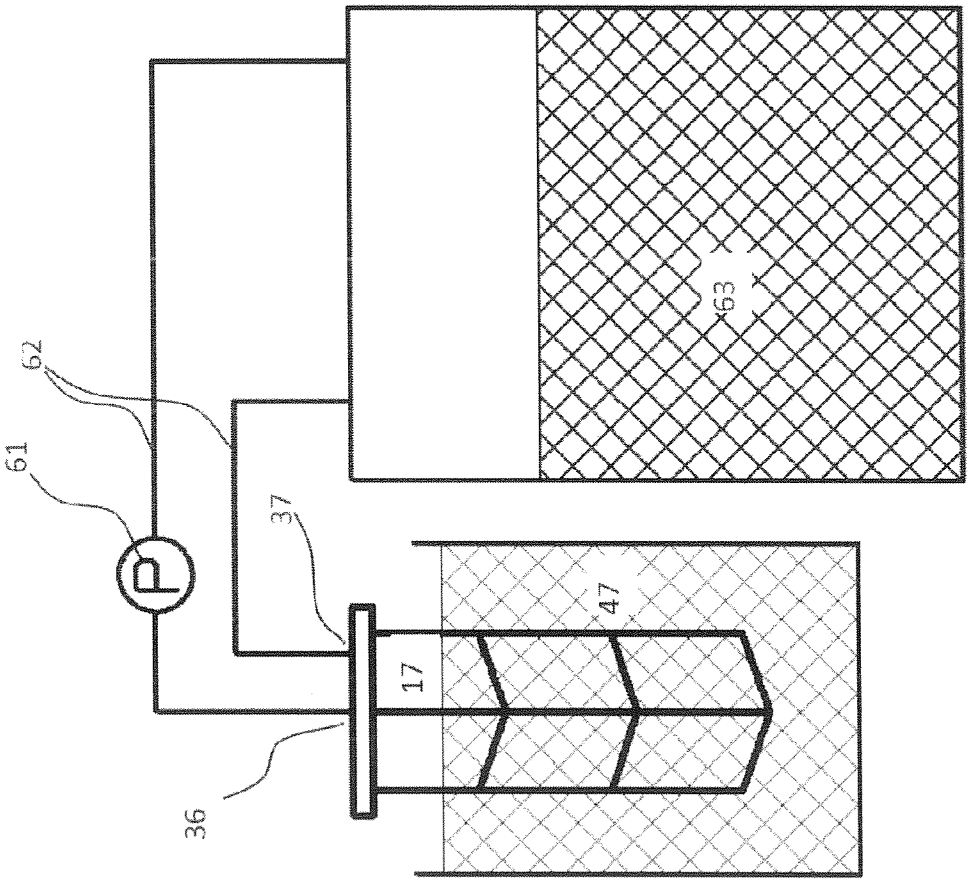
FIGS. 6A and 6B show systems according to the invention in exemplary application cases.
Figure 6A:
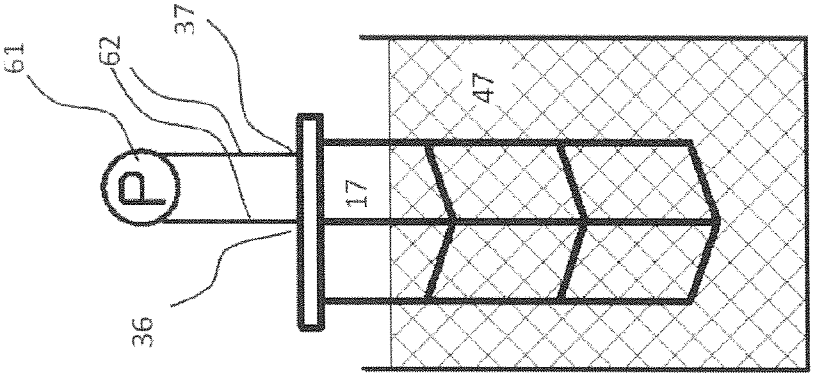

FIGS. 6A and 6B show systems according to the invention in exemplary application cases. In FIG. 6A, the system is situated in an outer volume (47) which is in communication with the inner volume (17) of the reaction vessel through the semipermeable membrane (not drawn). The inner volume (17) is circulated by a pump (61) which is connected to the functional openings (36 and 37) via liquid-guiding connections (62). Material exchange takes place between the inner volume (17) and the outer volume (47). FIG. 6B shows a system according to the invention having a circulation function and an external volume (63). The system is situated in an outer volume (47) which is in communication with the inner volume (17) of the system through the semipermeable membrane (not drawn). The inner volume (17) is in communication with an external volume (63) via liquid-guiding connections (62) and is continuously or periodically circulated by a pump (61) which is connected to the functional openings (36 and 37) and to the external volume (63). Material exchange takes place between the inner volume (17) and the external outer volume (63) by means of the pump (61) and also between the inner volume (17) and the outer volume (47) through the semipermeable membrane.

Figure 7:
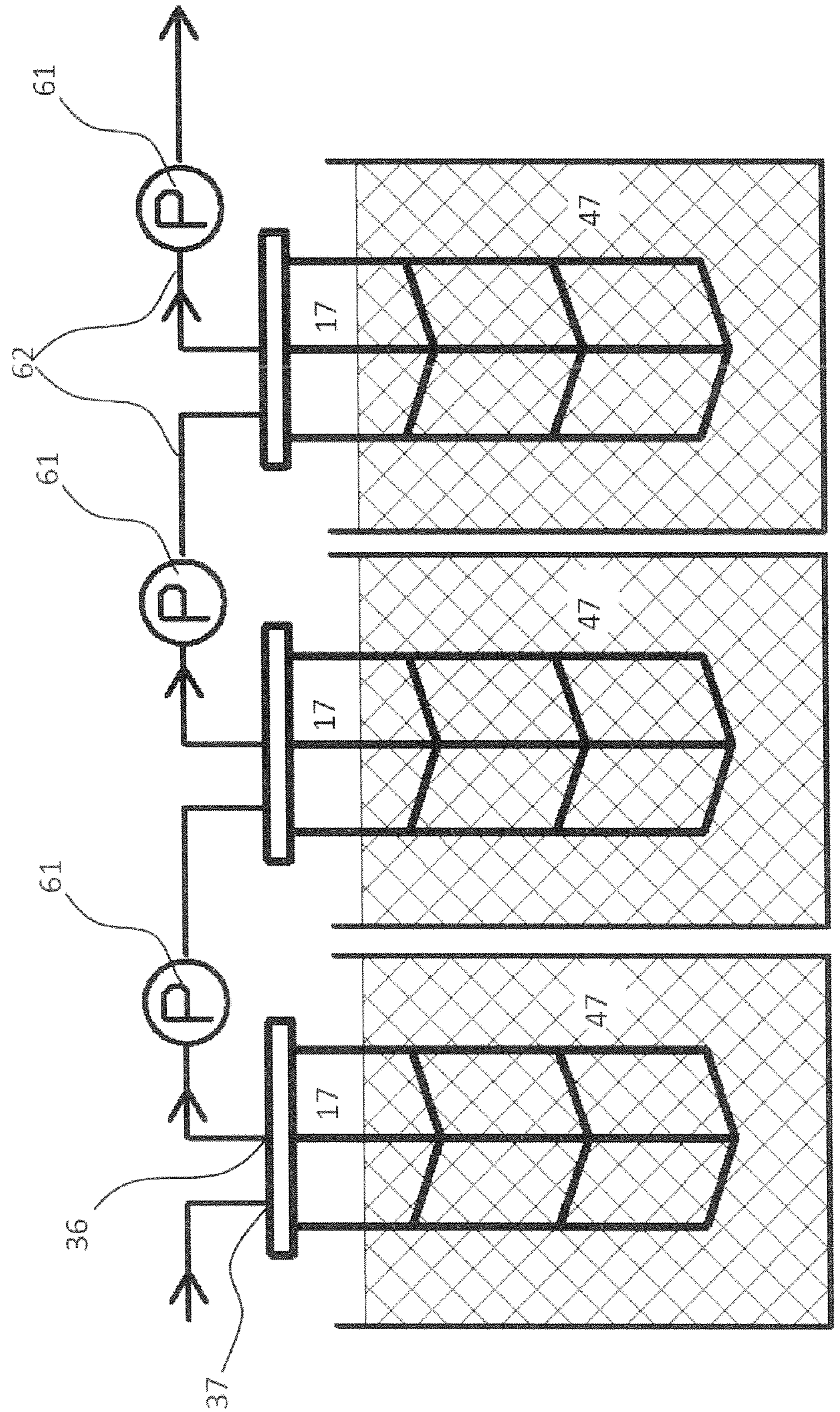
FIG. 7 shows multiple systems according to the invention in corresponding outer volumes (47) which are in communication with inner volumes (17) of the base bodies through the semipermeable membrane (not drawn).

FIG. 7 shows multiple systems according to the invention in corresponding outer volumes (47) which are in communication with inner volumes (17) of the base bodies through the semipermeable membrane (not drawn). The inner volume (17) of the first reaction vessel, which is in communication with the outer volume (47) through the semipermeable membrane(s) (not drawn), is, by means of a pump (61) connected via liquid-guiding connections (62) and the openings (36 and 37), continuously or periodically conveyed into a second reaction vessel, which is in communication with the outer volume (47) through the semipermeable membrane (s) (not drawn). From there, it is in turn, by means of a pump (61) connected via liquid-guiding connections (62) and the openings (36 and 37), continuously or periodically conveyed into a third inner volume, which is in communication with the outer volume (47) through the semipermeable membrane (s) (not drawn). Material exchange takes place between the inner volumes (17) and the outer volumes (47), and these can have an identical or different starting composition.

Figure 8B:
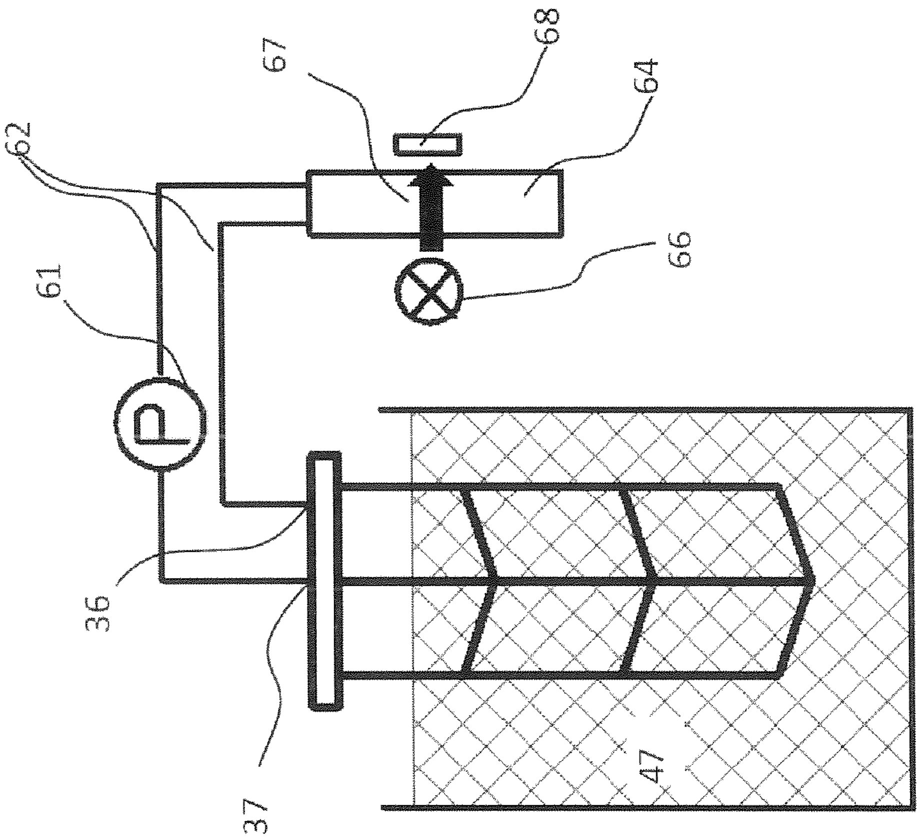
FIGS. 8A and 8B show exemplary embodiments of external process tracking of the processes in the system according to the invention.
Figure 8A:
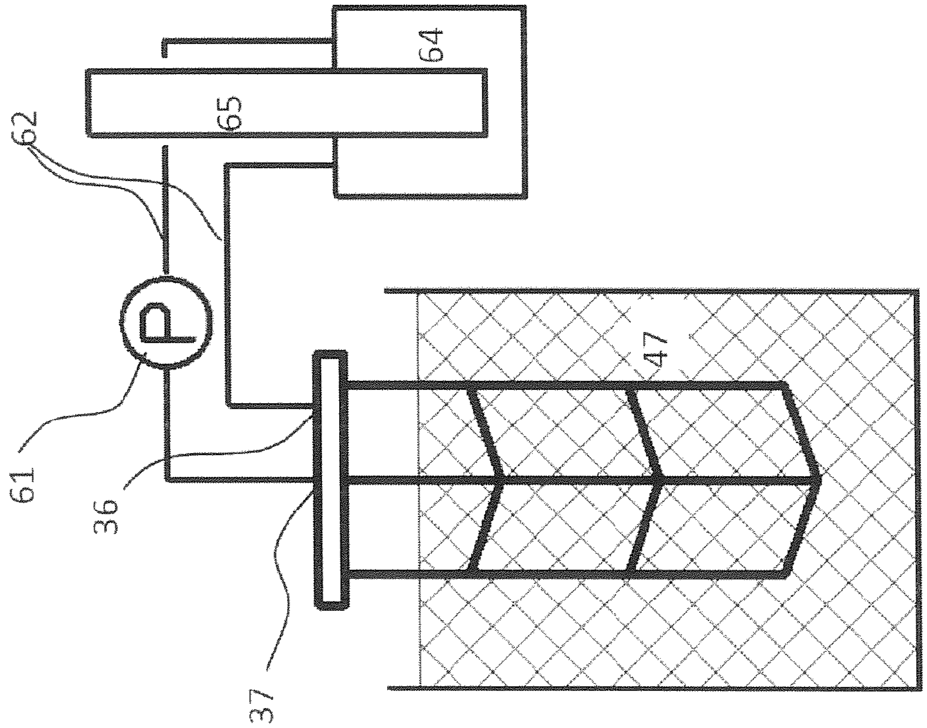

FIGS. 8A and 8B show exemplary embodiments of external process tracking of the processes in the system according to the invention. In FIG. 8A, the system is situated in an outer volume (47) which is in communication with the inner volume through the semipermeable membrane (not drawn). By means of a pump (61), the inner volume is continuously or periodically circulated through a measurement cell (64), which is connected to the openings (36 and 37) via liquid-guiding connections (62). Material exchange takes place between the inner volume and the outer volume (47), the composition of the liquid in the inner volume changing. These changes are captured by one or more measurement devices (65). Measurement variables can, for example, be temperature, viscosity, conductivity, pH, glucose content, oxygen content, $CO_2$ content, ion concentration, measured by means of ion-selective sensors ($Ca^{2+}$, $K^+$, $Na^+$, $F^-$, $NH4^+$), potentiometry, radioactivity, etc., but are not limited thereto. In FIG. 8B, the system is situated in an outer volume (47) which is in communication with the inner volume of the reaction vessel through the semipermeable membrane (not drawn). By means of a pump (61), the inner volume is continuously or periodically circulated through a measurement cell (64), which is connected to the openings (36 and 37) via liquid-guiding connections (62). Material exchange takes place between the inner volume and the outer volume (47), the composition of the liquid in the inner volume changing. Here, the liquid of the inner volume does not come into contact with the measurement device itself, but only with an auxiliary volume, for example designed as a cuvette, in the measurement cell (64). The measurement device consists, for example, of an emitter (66) which sends a light beam (67) through the cuvette as measurement cell (64) and is analyzed by means of the detector (68). What can thus be measured are, for example, but not limited thereto: fluorescence, absorbance, color, luminescence, turbidity, optical angle of rotation, etc.

Figure 9:
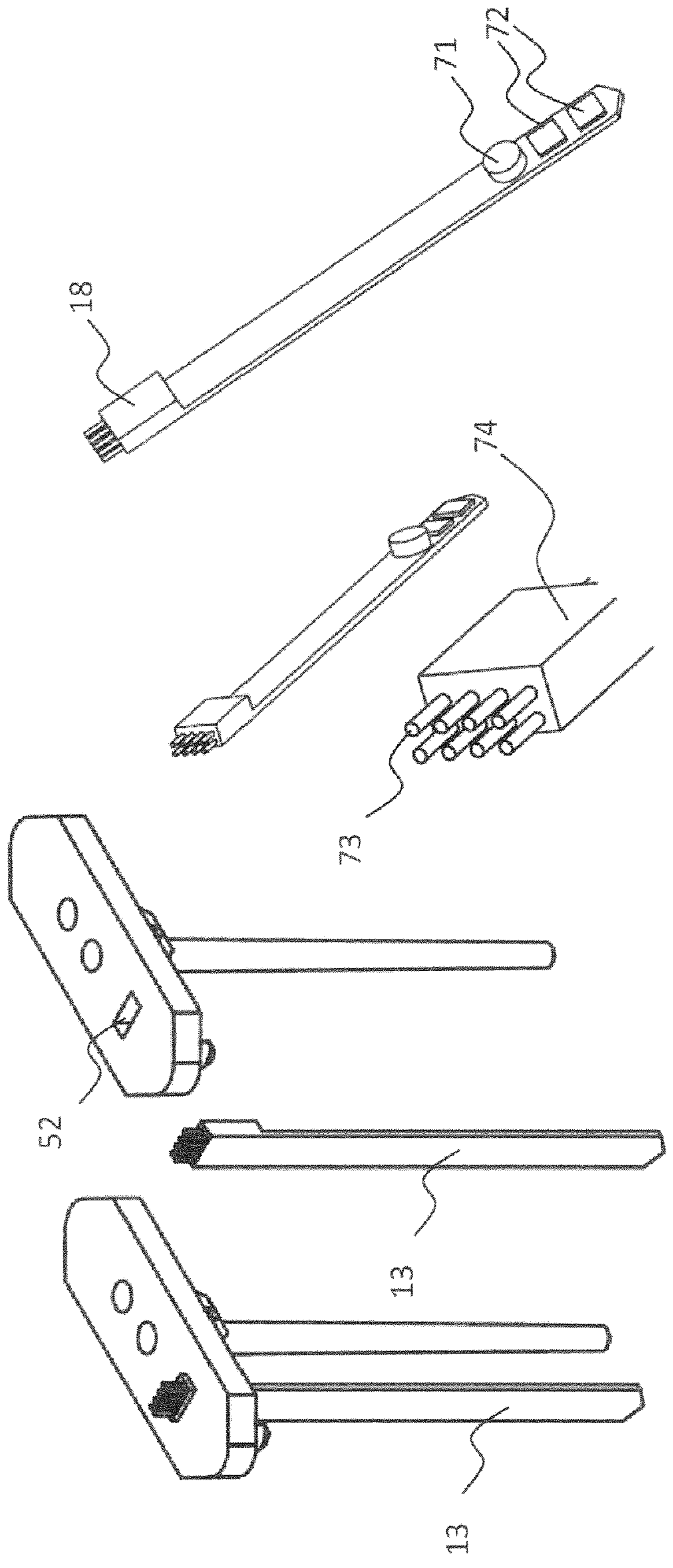
FIG. 9 shows multiple components of a lid and associated functional support.

FIG. 9 shows multiple components of a lid and associated functional support. As already described, the analysis and tracking of the material exchange between the inner volume and the outer volume is a major advantage of embodiments of the system according to the invention. The sensors required to this end can be a component of the lid, of the base body or of both parts. Preferably, they are a functional feature of the lid. In the present exemplary embodiment, the sensors are arranged on a functional support (13). The support contains one or more types of sensors, a temperature sensor (71) and two flat electrodes (72) for measurement of electrical conductivity in the present example. However, various other sensors are also possible. The sensors are, by means of conducting paths incorporated in the support and electrically insulated against the liquid, connected to the proximal end of the functional support (18), the upper end of which bears contact pins (73). Connected thereto by means of a plug connection is the evaluation electronics of the sensors. The lateral faces (74) of the head piece (18) simultaneously serve as sealing faces which allow a media-tight insertion of the functional support (13) into an appropriate recess (52) of the lid.

Figure 10B:
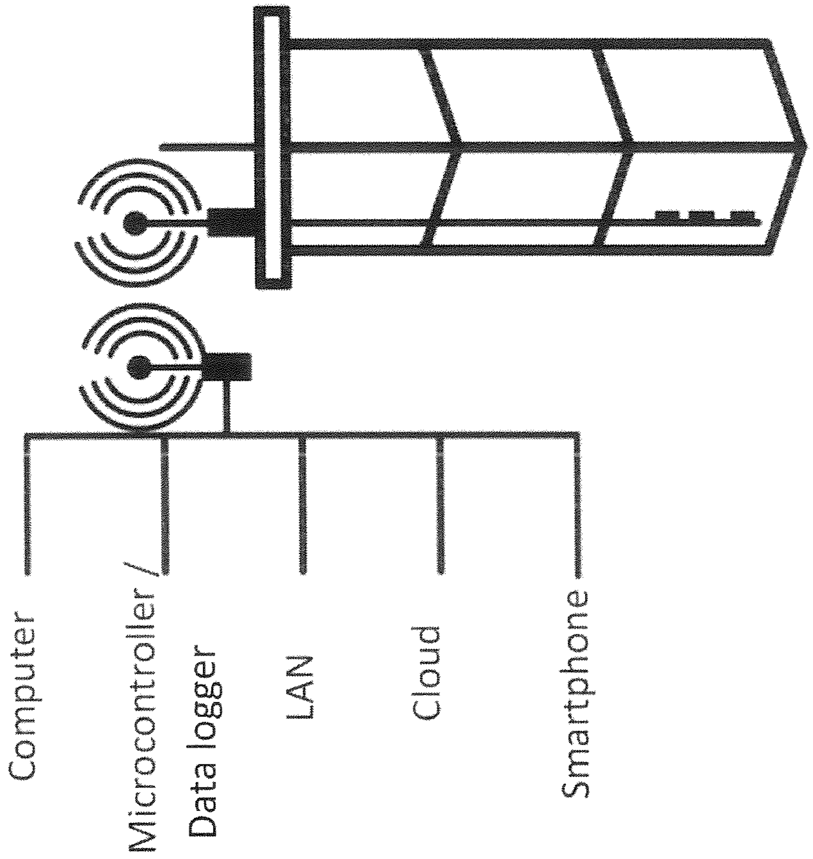
FIGS. 10A and 10B illustrate the connection of the sensors to appropriate evaluation electronics.
Figure 10A:
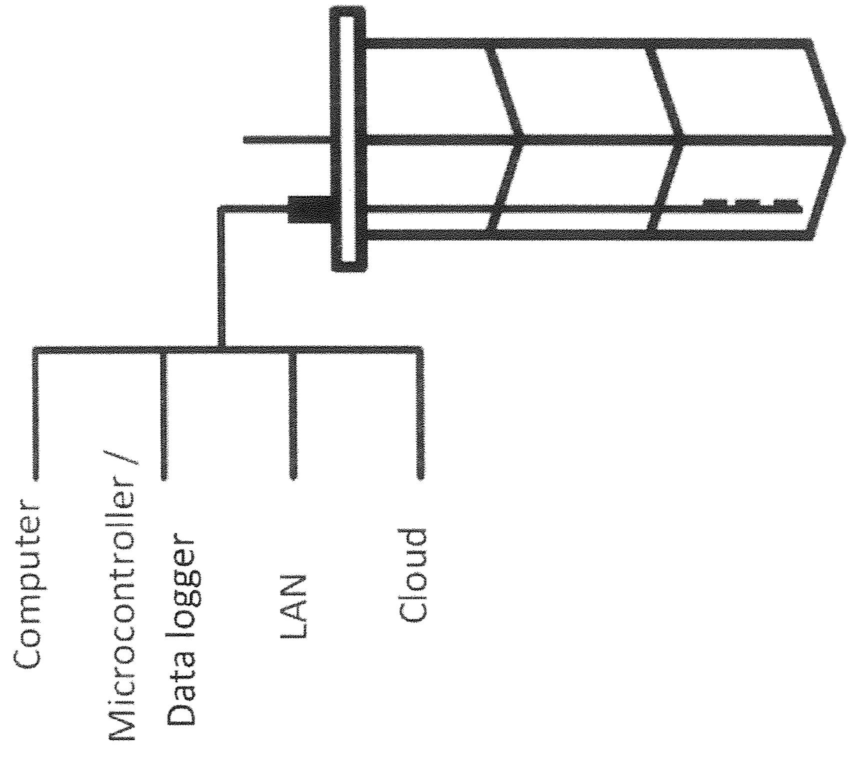

FIGS. 10A and 10B illustrate the connection of the sensors to appropriate evaluation electronics by means of cable (FIG. 10A) or wirelessly by means of radio, RFID, WLAN, Bluetooth, WiFi, etc. (FIG. 10B).

Figure 11:
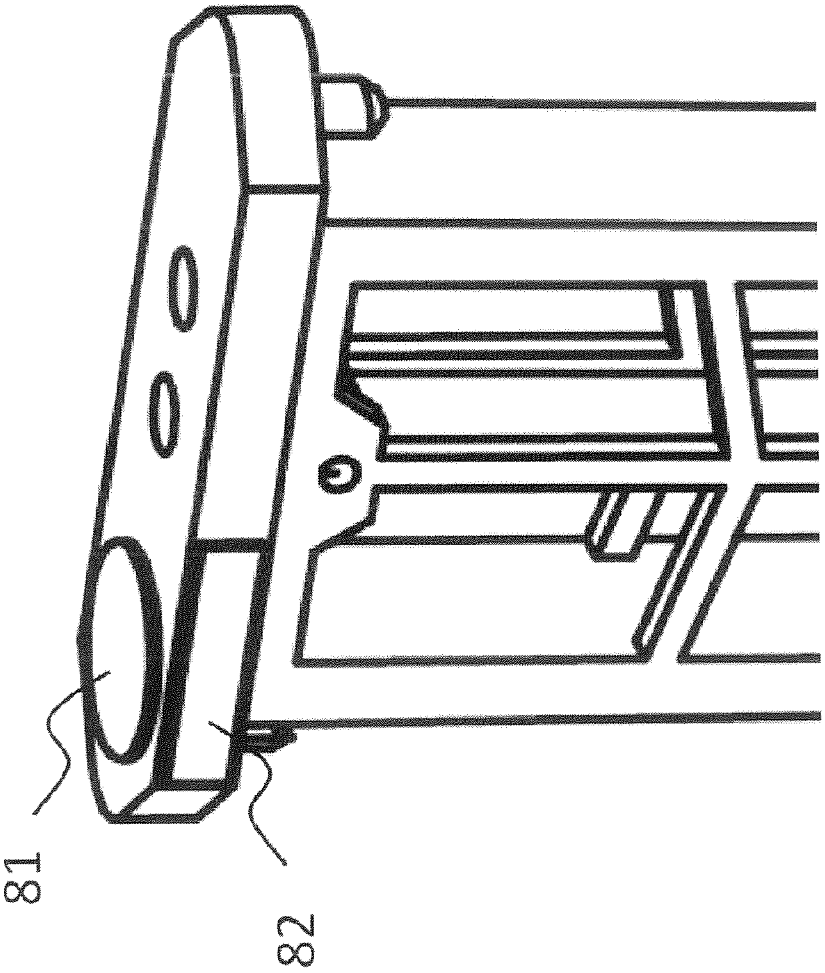
FIG. 11 illustrates the optional marking or storage of items of information on the system.

FIG. 11 illustrates the optional marking or storage of items of information on the system, especially on the lid, for example serial number, membrane type, on a labeling field (82) in human- or machine-readable form (e.g., barcode). Forgery-proof branding, for example by means of a hologram, is according to the invention, too. Also possible is the marking or storage of items of information on the system, for example serial number, membrane type, in machine-readable form (e.g., RFID chip, (81)).

Figure 12:
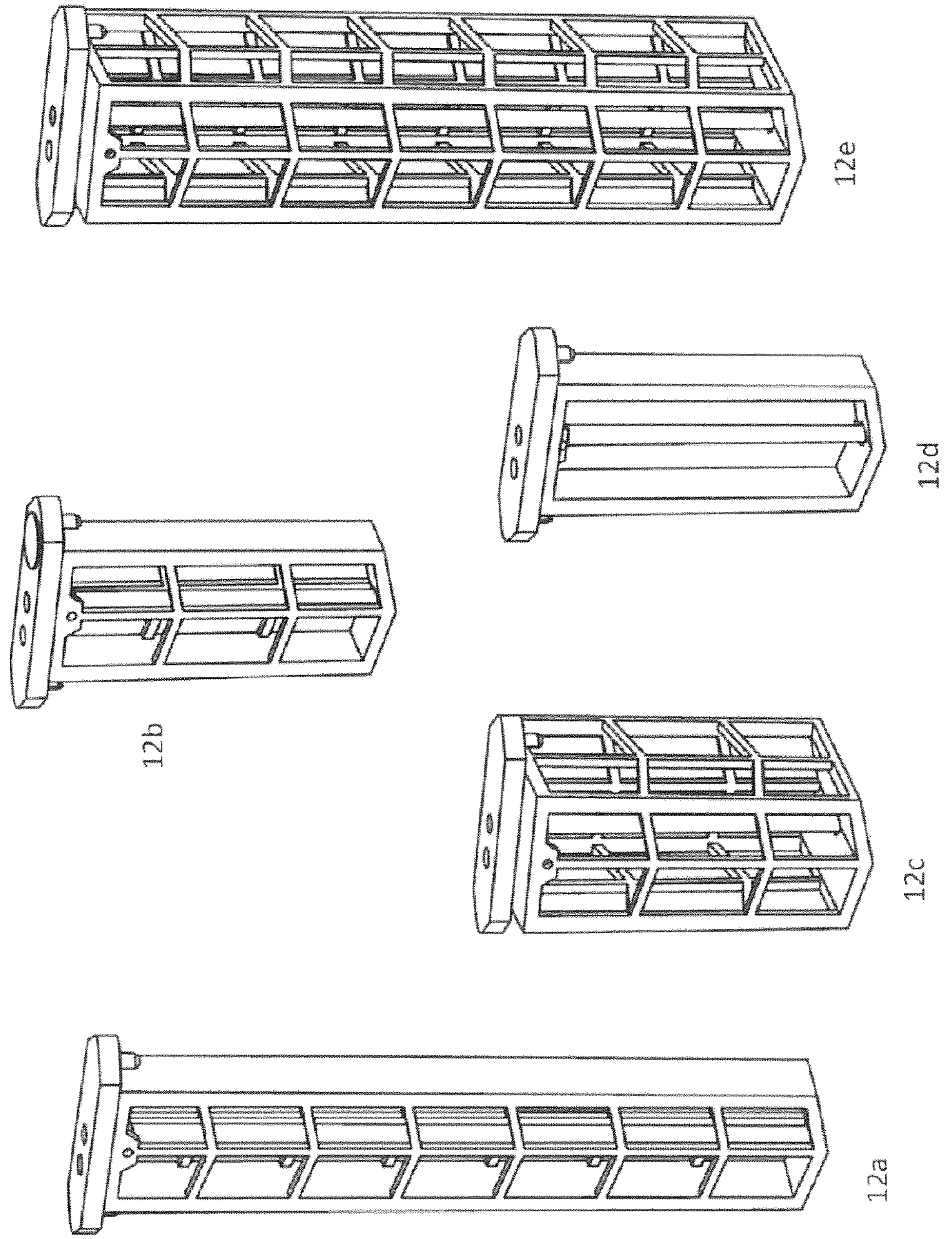
FIG. 12 shows further variants of the base body of the system according to the invention.

FIG. 12 shows further variants of the base body of the system according to the invention, especially in various sizes.

EXAMPLE

1. Kinetics at Room Temperature

Time-dependent performance of a dialysis of 0.5 mM pNP (para-nitrophenol) against PBS (phosphate-buffered saline) at room temperature in a system according to the invention (XMR-1) having an outer volume as per FIG. 4*a* (n=6). The sample amount in the inner volume was 15 ml, and the buffer amount in the Hitplate was 50 ml. Measurement was carried out after 30, 60, 120, 240, 360, 480 and 1440 min in the UV/Vis spectrometer Spectramax (Software Softmax Pro 7.0) at 400 nm.

Figure 13A:
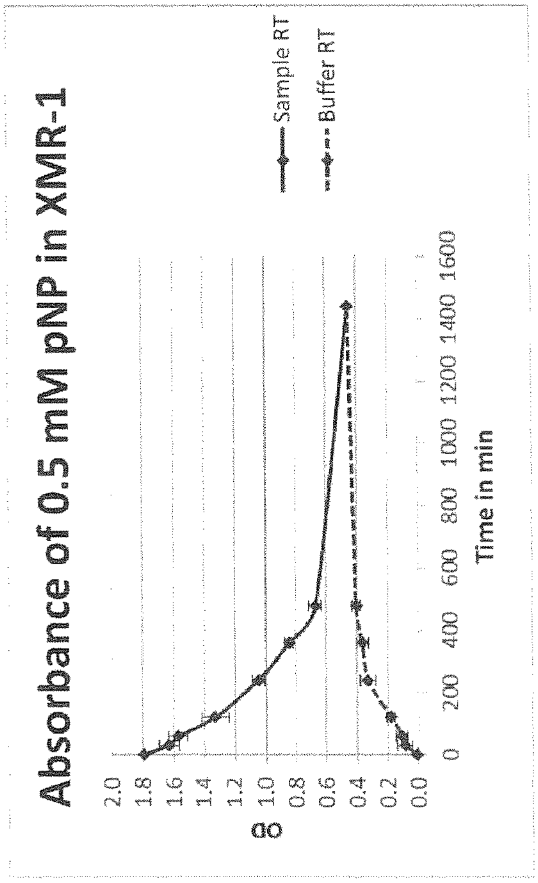
FIG. 13A is a chart showing absorbance of 0.5 mM bNP in XMR-1 over time
Figure 13B:
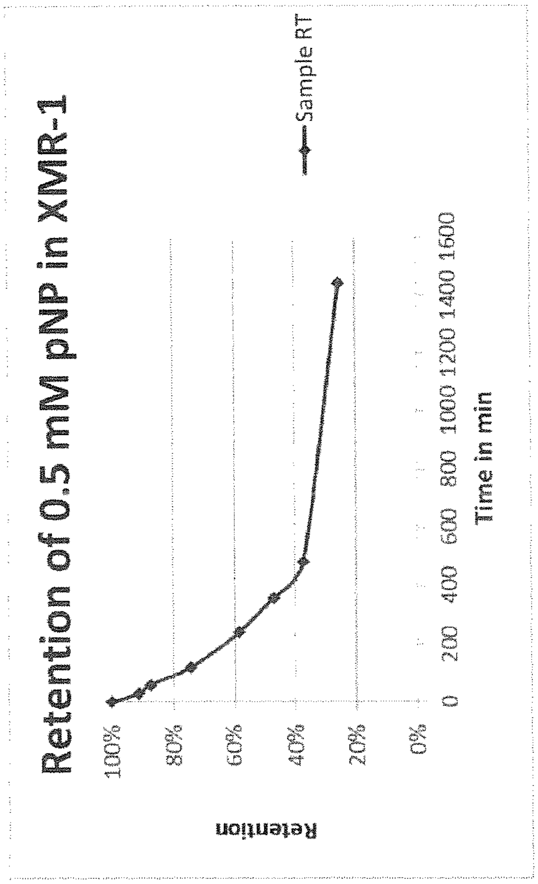
FIG. 13B is a chart showing the retention of 0.5 mM pNP in XMR-1 over time.

The course of absorbance over time is shown in FIG. 13A; retention is shown in FIG. 13B. In the dialysis in XMR-1, equilibrium is reached no later than after approx. 24 h. After 24 h, the concentration remaining in the dialyzer is 25% of the starting concentration.

2. Dialysis in a Refrigerator and Incubator

Performance of a dialysis of 0.5 mM pNP against PBS in XMR-1 in a refrigerator (at 4.8-7.7° C.) and in an incubator (at 40.2-42.3° C.) (n=3). The sample amount in the inner volume was 15 ml, and the buffer amount in the Hitplate was 50 ml. Measurement was carried out after 60, 120, 240, 480 and 1440 min in the UV/Vis spectrometer Spectramax (Software Softmax Pro 7.0) at 400 nm.

Figure 14B:
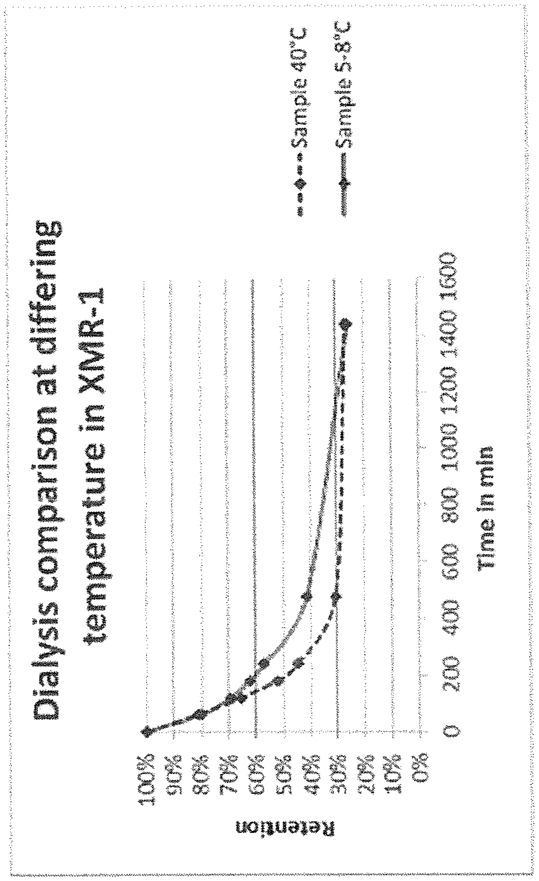
FIG. 14A is a chart showing the dialysis comparison of absorbance at differing temperature in XMR-1 over time and FIG. 14B is a chart showing the dialysis comparison of retention at differing temperature in XMR-1 over time.
Figure 14A:
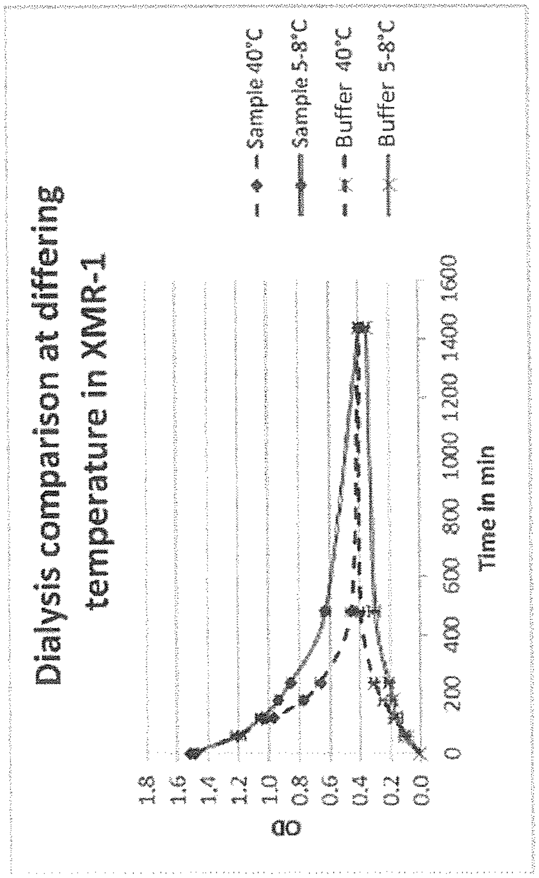
Figure 15:
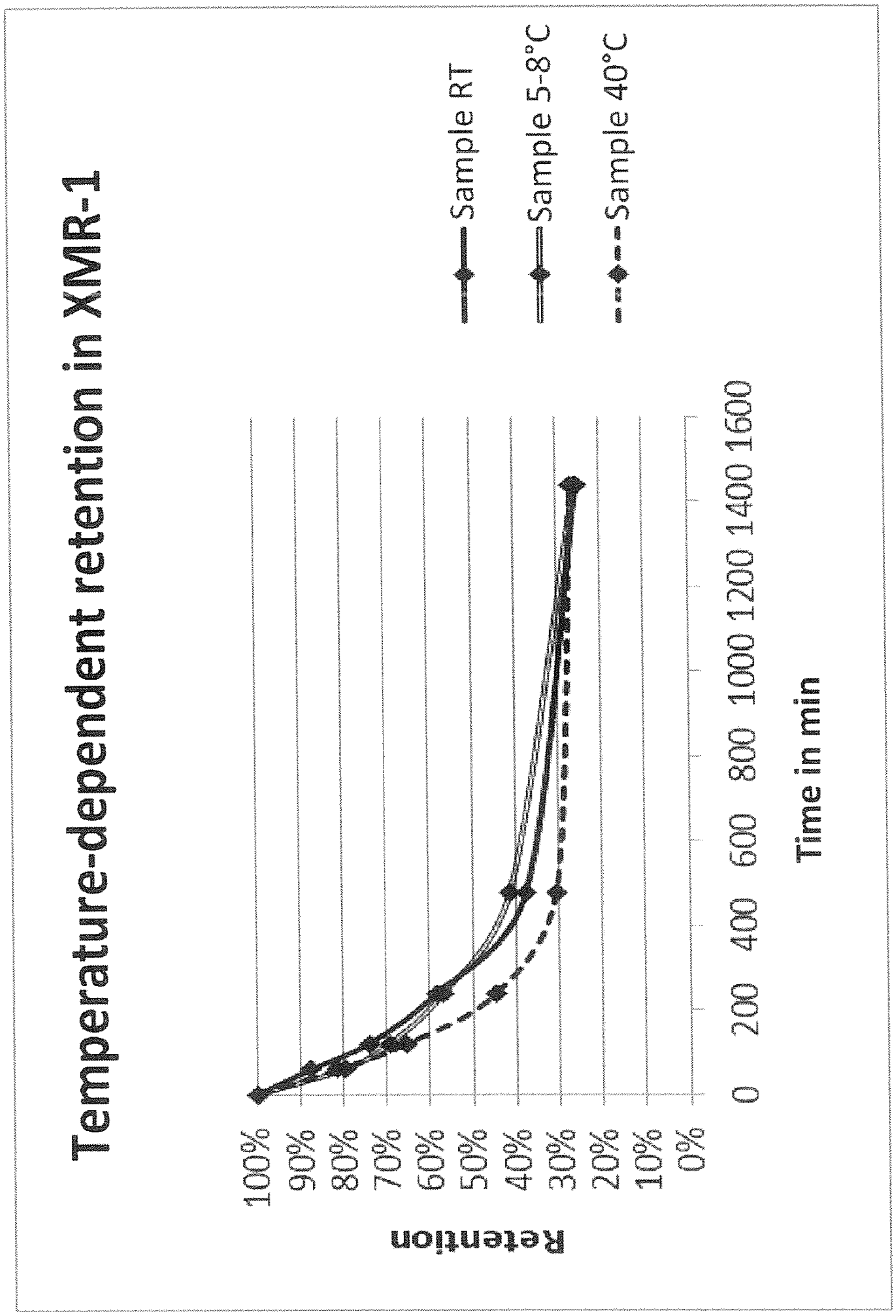
FIG. 15 is a chart showing a comparison of the temperature-dependent retention courses over time.

The course of absorbance over time is shown in FIG. 14A; retention is shown in FIG. 14B. FIG. 15 shows a comparison of the temperature-dependent retention courses. Dialysis proceeds significantly more rapidly in the incubator than in the refrigerator. In the refrigerator in turn, the reaction proceeds more slowly than at room temperature. For the comparison at room temperature, the values of the experiment mentioned in point 1. were used.

3. Dialysis with Sample Circulation

Performance of a dialysis of 0.5 mM pNP against PBS at room temperature in XMR-1. With the aid of a peristaltic pump, the sample was circulated in an XMR-1, as shown in FIG. 6A, and, in a further experiment, the sample was mixed with air by means of a peristaltic pump (n=1; standard: n=2). The sample amount in the inner volume was 15 ml, and the buffer amount in the Hitplate was 50 ml. Measurement was carried out after 60, 120, 180, 240 min in the UV/Vis spectrometer Spectramax (Software Softmax Pro 7.0) at 400 nm.

Figure 16B:
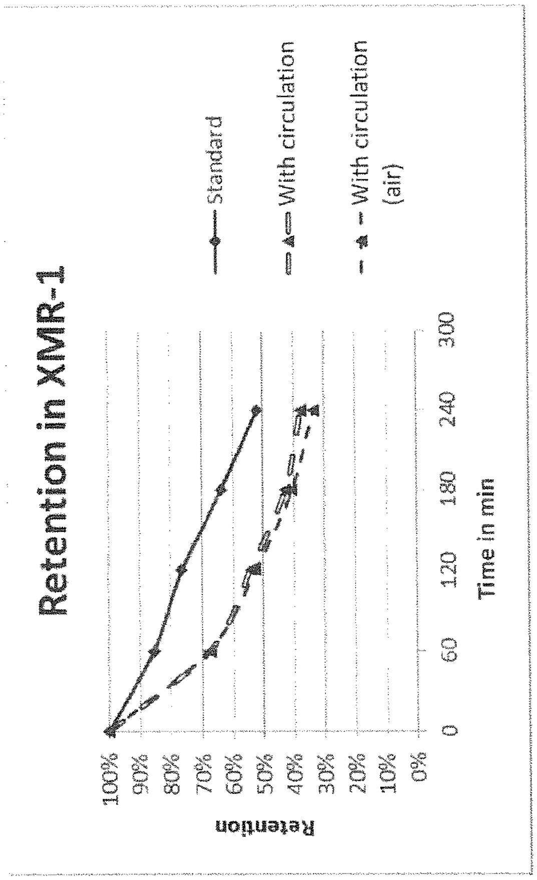
FIG. 16A is a chart showing the course of absorbance over time and FIG. 16B is a chart showing the retention in XMR-1 over time.
Figure 16A:
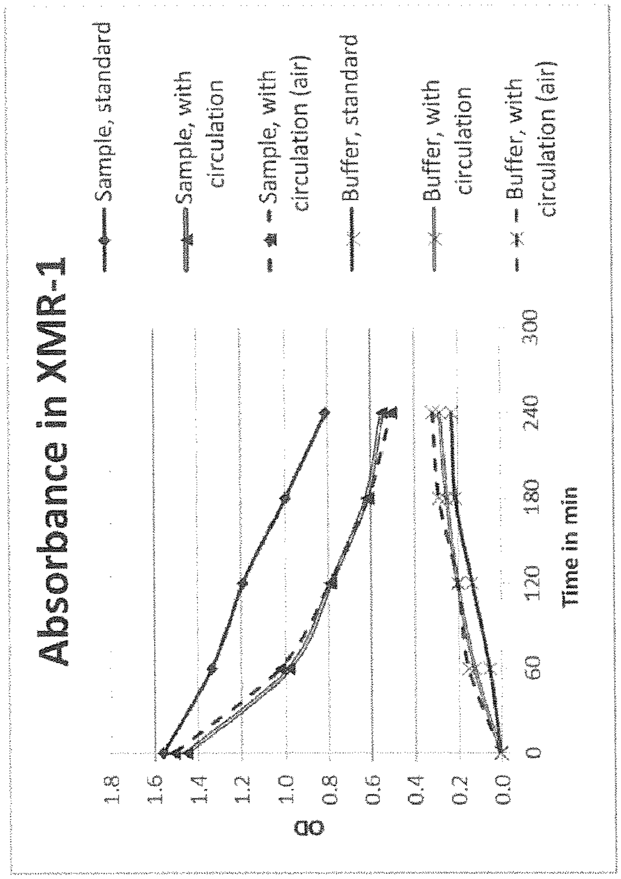

The course of absorbance over time is shown in FIG. 16A; retention is shown in FIG. 16B. Dialysis proceeds significantly more rapidly with circulation. In the comparison between circulation through circular pumping of the sample and pumping of air, it becomes apparent that there are, according to a singular experiment, no distinct differences in the dialysis rate.

LIST OF REFERENCE SIGNS

10 System
11 Base body
12 Lid
13 Functional support
14 Functional feature
15 Structural element
16 Membrane
17 Inner volume
18 Proximal end of the functional support
19 Distal end of the functional support
20 Sealing section
21 Crossbeam
22 Center strut
23 Opening in the base body
24 Snap-in opening
25 Lateral faces
26 Distal section
27 Functional opening
31 Protrusion
32 Sealing face
33 Sealing element
34 Snap-in attachment
35 Sealing section
36, 37 Functional openings in the lid
38 Fill-in opening
39 Holding means
41 Microtiter plate
42 Laboratory vessel
43 Lid
44 Recess
45 Float
47 Outer volume
51 Electronic components
52 Recess in the lid
53 Angular pieces
54 Air outlet
55 Connecting piece
56 Electric motor
57 Propeller stirrer
61 Pump
62 Liquid-guiding connection
63 External volume
64 Measurement cell
65 Measurement devices
66 Emitter
67 Light beam
68 Detector
71 Sensor
72 Electrodes
73 Contacting means
74 Lateral faces at the proximal end of the functional support
81 Data carrier
82 Labeling field

What is claimed is:

1. A system for carrying out biological or chemical methods, comprising:
at least one base body, and
at least one separately provided lid which is matched with the base body such that lid and base body can form a firm connection with one another,
wherein the base body comprises at least one structural element and at least one semipermeable membrane and the semipermeable membrane at least sectionally borders an inner volume of the base body as a lateral wall running substantially in parallel to the longitudinal axis of the base body,
wherein the lid comprises at least one functional support which is, at its proximal end, connected to a sealing section of the lid and comprises, in the region of its distal end, one or more functional features,
wherein the inner volume has a proximal section which is, upon connection of lid and base body, arranged in the proximity of the sealing section and a distal section which has, upon connection of lid and base body, a distance from the sealing section that is at least 90% of the maximal distance from the sealing section within the inner volume,
wherein the distal end of the functional support is, upon connection of lid and base body, arranged in the distal section,
wherein the functional features are suitable for capturing, changing and/or influencing states of biological or chemical methods.

2. The system as claimed in claim 1, wherein the base body has an opening of the inner volume that is, upon connection of the base body to the lid, closed by the sealing section thereof.

3. The system as claimed in claim 1, wherein the inner volume is from 50 µl to 200 ml.

4. The system as claimed in claim 1, wherein a functional feature is a sensor.

5. The system as claimed in claim 1, wherein a functional feature is a gas-supply opening, filling opening r removal opening, or a combination thereof.

6. The system as claimed in claim 1, wherein a gas-tight closure is achieved by connection of lid and base body.

7. The system as claimed in claim 1, wherein the lid comprises at least one positioning element for connection of the lid to further lids, to an outer vessel or to a float.

8. The system as claimed in claim 1, wherein the lid comprises multiple functional supports having different functional features.

9. The system as claimed in claim 1, wherein the lid comprises contacting elements, especially for supply of power and/or transmission of data.

10. The system as claimed in claim 1, wherein the inner volume is from 1000 μl to 50 ml.

11. The system as claimed in claim 4, wherein the functional feature is a temperature sensor or a conductivity sensor or a combination thereof.

12. The system as claimed in claim 6, wherein the gas-tight closure is achieved by a lip seal, an elastic seal or adhesive bonding, potting, welding or overmolding.

13. The system as claimed in claim 1, wherein the semipermeable membrane at least sectionally borders the inner volume of the base body as a lateral wall thereof running substantially in parallel to the longitudinal axis of the base body.

14. The system as claimed in claim 1, wherein the semipermeable membrane at least sectionally borders the inner volume of the base body as a lateral wall running substantially in parallel to the longitudinal axis of the base body in order to allow material exchange with an outer volume across the semipermeable membrane.

15. A method for carrying out biological or chemical methods using the system as claimed in claim 1, comprising the steps:

providing an outer volume, providing a base body, selecting a suitable lid with respect to the functional features thereof, connecting base body and lid, inserting base body with lid into the outer volume.

* * * * *